(12) United States Patent
Ness

(10) Patent No.: US 6,863,025 B2
(45) Date of Patent: Mar. 8, 2005

(54) PET WATERER AND FEEDER

(76) Inventor: William Van Ness, 7 Red Rock Trail, Saddle River, NJ (US) 07458

( * ) Notice: Subject to any disclaimer, the term of this patent is extended or adjusted under 35 U.S.C. 154(b) by 0 days.

(21) Appl. No.: 09/739,453

(22) Filed: Dec. 18, 2000

(65) Prior Publication Data

US 2002/0073926 A1 Jun. 20, 2002

(51) Int. Cl.$^7$ ................................................ A47B 1/04
(52) U.S. Cl. ...................... 119/72; 119/51.5; 119/52.1
(58) Field of Search ........................... 119/72, 51.5, 74, 119/52.1, 53

(56) References Cited

U.S. PATENT DOCUMENTS

| | | | | |
|---|---|---|---|---|
| 3,720,184 A | * | 3/1973 | Pearce .......................... | 119/51.5 |
| 3,730,141 A | * | 5/1973 | Manning et al. ............ | 119/51.5 |
| 4,034,715 A | * | 7/1977 | Arner .......................... | 119/51.5 |
| 4,134,365 A | * | 1/1979 | Futers et al. ................ | 119/51.5 |
| 4,281,624 A | * | 8/1981 | Raines ........................ | 119/52.1 |
| 4,721,063 A | * | 1/1988 | Atchley ....................... | 119/52.1 |
| 4,840,143 A | * | 6/1989 | Simon ......................... | 119/52.1 |
| 4,947,796 A | * | 8/1990 | Robinette ................... | 119/51.5 |
| 5,433,171 A | * | 7/1995 | Ewell .......................... | 119/51.5 |
| D374,109 S | * | 9/1996 | Lillelund et al. ........... | D30/121 |
| 5,809,934 A | * | 9/1998 | Gavet .......................... | 119/52.1 |
| D406,924 S | * | 3/1999 | Kolozsvari .................. | D30/121 |
| 6,055,932 A | * | 5/2000 | Weber ......................... | 119/52.1 |
| 6,109,211 A | * | 8/2000 | Tomlinson .................. | 119/165 |
| 6,142,099 A | * | 11/2000 | Lange, Jr. .................... | 119/51.5 |
| 6,378,460 B1 | * | 4/2002 | Skurdalsvold et al. .... | 119/61.56 |
| 6,467,428 B1 | * | 10/2002 | Andrisin et al. ............ | 119/51.5 |

FOREIGN PATENT DOCUMENTS

WO WO-0035273 A1 * 6/2000

* cited by examiner

Primary Examiner—Michael J. Carone
Assistant Examiner—M Thomson
(74) Attorney, Agent, or Firm—Thomas A. O'Rourke; Bodner & O'Rourke

(57) ABSTRACT

A pair of pet waterers, a pair of pet feeders or a pet feeder and a pet waterer adapted to be packaged together in a manner that reduces the volume occupied by the combination compared to if they were packaged separately. The pet feeder has a feed receptacle for storing feed. A first end of the feed receptacle when placed in a first tray occupies only a portion of the tray. The pet waterer has a water receptacle for storing water. A first end of the water receptacle when placed in a second tray occupies only a portion of the tray. A second end of the feed receptacle is adapted to be received by the second tray and a second end of the water receptacle is adapted to be received first tray.

32 Claims, 6 Drawing Sheets

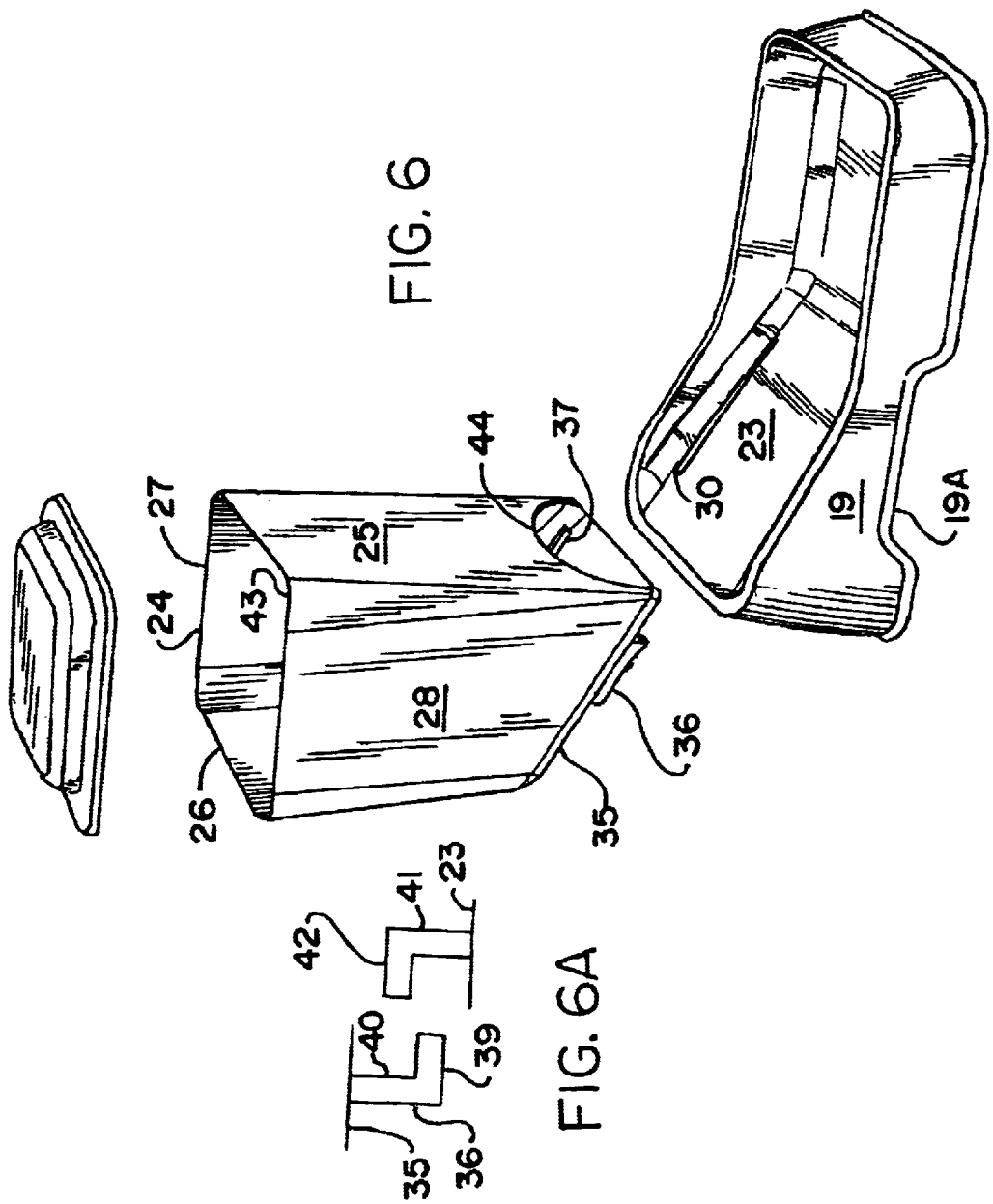

PET WATERER AND FEEDER

FIELD OF THE INVENTION

The present invention relates to improved apparatus for providing food and/or water to animals particularly pets. The invention has particular applicability to providing food and water to such pets as cats and dogs.

BACKGROUND OF THE INVENTION

While there are many different types of pet food available to the consumer, they frequently can be divided into two general categories, canned and dried. Canned pet food is typically moister than dried pet food, which is more often than not sold in bags or cartons. Where the food is relatively moist, the product is typically placed in a bowl and the pet can access the food as desired from the bowl. If the bowl needs to be refilled the owner usually must manually refill the bowl by either opening a new can and emptying the contents or pouring additional food from the container to the bowl. For food of a dryer consistency the food can be placed in the bowl as in the case of the moist pet food and can also be placed in a dispenser that will typically hold more than just an single meal for the pet. These dispensers will release an additional portion of the food as the food in the dish is eaten. The advantage of the dispenser is that a greater quantity of food is available to the pet over a longer period of time. This has benefits if the family is delayed in returning home at dinnertime. With the dispenser, the additional food is present and the pet will not miss a meal. In many of these dried food dispensers, the refilling aspect of the device is gravity fed. Because of the viscosity of the moist pet food, the gravity fed dispensers are not commonly used with moist food as these foods have a tendency to agglomerate together when placed in the dispenser and have a difficulty in refilling the bowl once a portion has been eaten.

Water dishes are also a common feature of many households with pets today. These dishes provide the family pet with a source of fresh water during the day to re-hydrate the animal. Water dishes can also be a mere bowl or can be a more elaborate structure that holds a significant quantity of water so that the pet has a access to sufficient water even during the hottest days. Where the waterer contains a large quantity of water one concern is the ease of refilling the container. In the past many of the waterers relied on a empty two liter soda bottle as the reservoir for the water. In these devices an empty soda bottle is filled with water and the tray was connected to the soda bottle usually by means of a threaded connection. The combination of the bowl and the bottle are transported to the site and inverted as they are placed on the floor or other surface. One of the problems that was encountered with these devices was spillage as the container was inverted. Water would inevitably spill from the bowl when the combination was set up. In addition, any time the waterer was lifted and moved for example to be refilled, cleaned or transported to a new location, if water was present there always seemed to be a spill.

Another problem with waterers and feeders was the issue of shipping and packaging. Many products today have to be packed for shipping from the factory to the store in as compact a package as possible. Whether shipped by rail car or tractor trailer a primary determinant of the shipping cost is the volume being shipped. As a result, there is a need to ship as much product as possible in a given volume. Similarly, in many retail locations, shelf space is at a premium. Retailers seek to have a broad range of products and shelf area for an item is frequently small. However, because empty shelves translate into lost sales most retailers want to be able to fit as much of the product as possible into a given area. For this reason, there is a need for compact packaging of many products.

One of the problems with the prior art waterers has been the spillage of water during the refilling process. When the prior art waterer is running low of water and has to be refilled, if there is still some water in the tray or the container the user can carry the assembly to the water station and risk water spilling as the assembly is moved. If there is no water in the container but there is water in the tray, the user can attempt to remove the container from the tray and either just take the container to the water station or attempt to move the tray or base also. However, it is not uncommon for the act of removing the container from the tray to cause spillage from the tray. Also moving a base when water is present also risks spillage.

At the water station where the container is being filled, the prior art container is typically filled through the small dispensing orifice in the lower portion of the container. The user can fill the inverted container, insert the inverted container into the inverted tray and revert the entire assembly to its original configuration. Alternatively, the user can carry the filled inverted container to the pet watering site, revert the filled container and insert the container into the tray. If the container is inserted into the tray at the water station and the container is reverted there, the user must carry the assembly to the site risking spillage as the filled assembly is carried. In addition the act of reversion of the filled container either at the water station, the site where the base was left or any place else can also cause spillage. Accordingly, there is a need for a pet waterer that reduces the amount of spillage in removing the container from the base, in filling the container and in transporting the container.

Another common problem encountered in the prior art waterers is the problem of cleaning. Many of these waterers are almost completely enclosed and the only opening is the small orifice that is used for filling and dispensing. Even though most of the waterers only hold water, the interior of the waterer can still become dirty and in need of cleaning. Also, in many parts of the country there can be a build up of hard water deposits on the interior of the container that are difficult to clean. Thoroughly cleaning these containers through the dispensing orifice is very difficult if not impossible. As a result, there is a need for a waterer that may be readily and thoroughly cleaned. The problem of cleaning can, to a lesser extent, also become an issue with respect to feeders as well. Many prior art feeders do not permit the interior to received a thorough scrubbing due to their construction.

OBJECTS OF THE INVENTION

It is an object of the present invention to provide an improved pet feeder that provides improved dispensing of food into a bowl or tray with fewer clogs.

It is an object of the invention to provided an improved pet waterer that reduces the risk of leakage in filling, transporting and using the waterer.

It is an object of the invention to provide an improved combination pet waterer and feeder that may be shipped and stored in a compact arrangement.

It is an object of the invention to provide an improved pet waterer that may be shipped and stored in a compact arrangement with a second pet waterer of the same style.

It is an object of the invention to provide an improved pet feeder that may be shipped and stored in a compact arrangement with a second pet feeder of the same style.

It is an object of the present invention to provide a nesting pet waterer and feeder combination to reduce the amount of space the waterer and feeder occupy on a store shelf or in shipping.

It is an object of the present invention to provide nesting pet waterers to reduce the amount of space the waterers occupy on a store shelf or in shipping.

It is an object of the present invention to provide nesting pet feeders to reduce the amount of space the feeders occupy on a store shelf or in shipping.

It is a further object of the invention to provide an improved valve mechanism for use in a waterer that reduces the amount of spilled water in filling and transporting the container.

It is an additional object of the present invention to reduce the risk of spillage when lifting a partially filled water container away from the base or tray It is another object of the invention to provide a pet waterer that has a water receptacle that may be thoroughly cleaned by opening a cover that will provide access to the interior of the container.

SUMMARY OF THE INVENTION

A pet refreshment apparatus is described which may be a pet waterer and/or feeder and combinations thereof. The refreshment apparatus are adapted to be packaged together in a manner that reduces the amount of volume occupied by the apparatus compared to if they were packaged separately. The pet feeder has a feed receptacle for storing feed, which has a first end and a second end and a first tray to permit the pet to eat the feed. The first end of the feed receptacle when placed in the first tray occupies only a portion of the tray leaving the remainder for the feed. The pet waterer has a water receptacle for storing water. The receptacle has a first end and a second end and a second tray to permit the pet to drink the water. The first end of the water receptacle when placed in the second tray occupies only a portion of the tray. The second end of the feed receptacle is adapted to be received by the second tray and the second end of the water receptacle is adapted to be received by the first tray.

In another embodiment, there is a first pet feeder that has a feed receptacle for storing feed which receptacle has a first end and a second end and a first tray to permit the pet to eat the feed. The first end of the feed receptacle when placed in the first tray occupies only a portion of the tray leaving the remainder for the feed. There is a second pet feeder that also has a feed receptacle for storing feed. The receptacle has a first end and a second end and a second tray to permit the pet to eat the feed. The first end of the second feed receptacle when placed in the second tray occupies only a portion of the tray. The second end of the first feed receptacle is adapted to be received by the second tray and the second end of the second feed receptacle is adapted to be received by the first tray.

Alternatively, there are a pair of pet waterers The first pet waterer has a water receptacle for storing water which has a first end and a second end and a first tray to permit the pet to drink the water. The first end of the water receptacle when placed in the first tray occupies only a portion of the tray leaving the remainder for the water. There is a second pet waterer that also has a water receptacle for storing water. The receptacle has a first end and a second end and a second tray to permit the pet to drink the water. The first end of the second water receptacle when placed in the second tray occupies only d portion of the tray. The second end of the first water receptacle is adapted to be received by the second tray and the second end of the second water receptacle is adapted to be received by the first tray creating a compact assembly for shipping and storage as well as display.

BRIEF DESCRIPTION OF THE DRAWINGS

FIG. 6 is an exploded view of the feeder of FIG. 5.

FIG. 6A is a view of the flanges that may be used to retain the receptacle to the tray of the feeder.

DETAILED DESCRIPTION OF THE INVENTION

Figure 2:
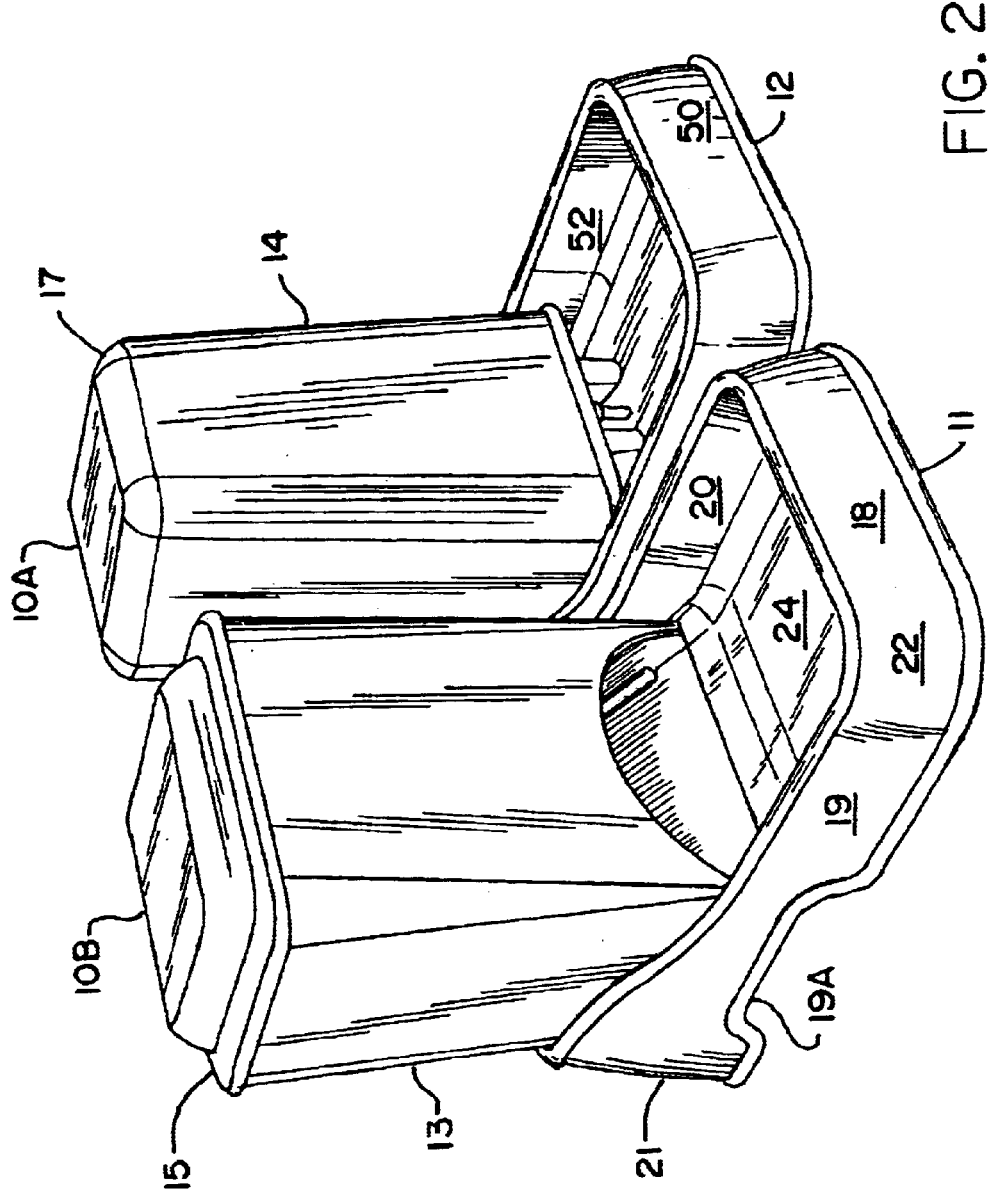
FIG. 2 shows the waterer and feeder of FIG. 1 in a side by side relationship.
Figure 3:
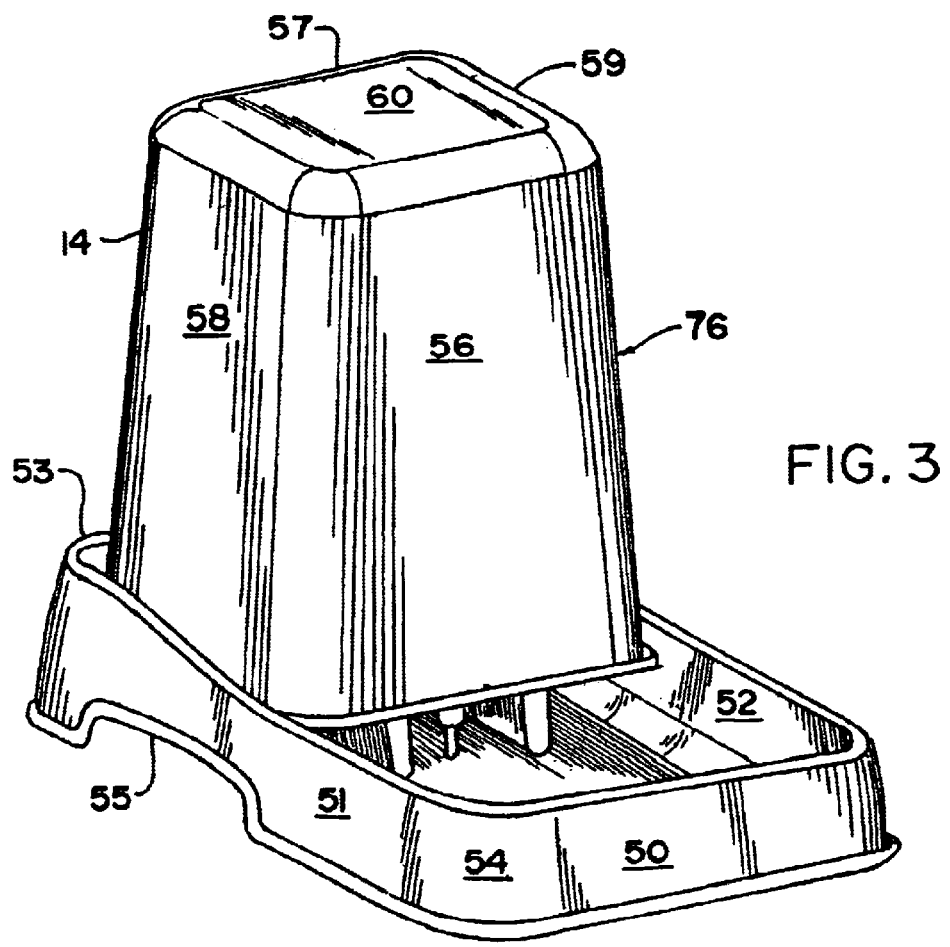
FIG. 3 is an enlarged view of the waterer of FIG. 2.
Figures 4, 4A:
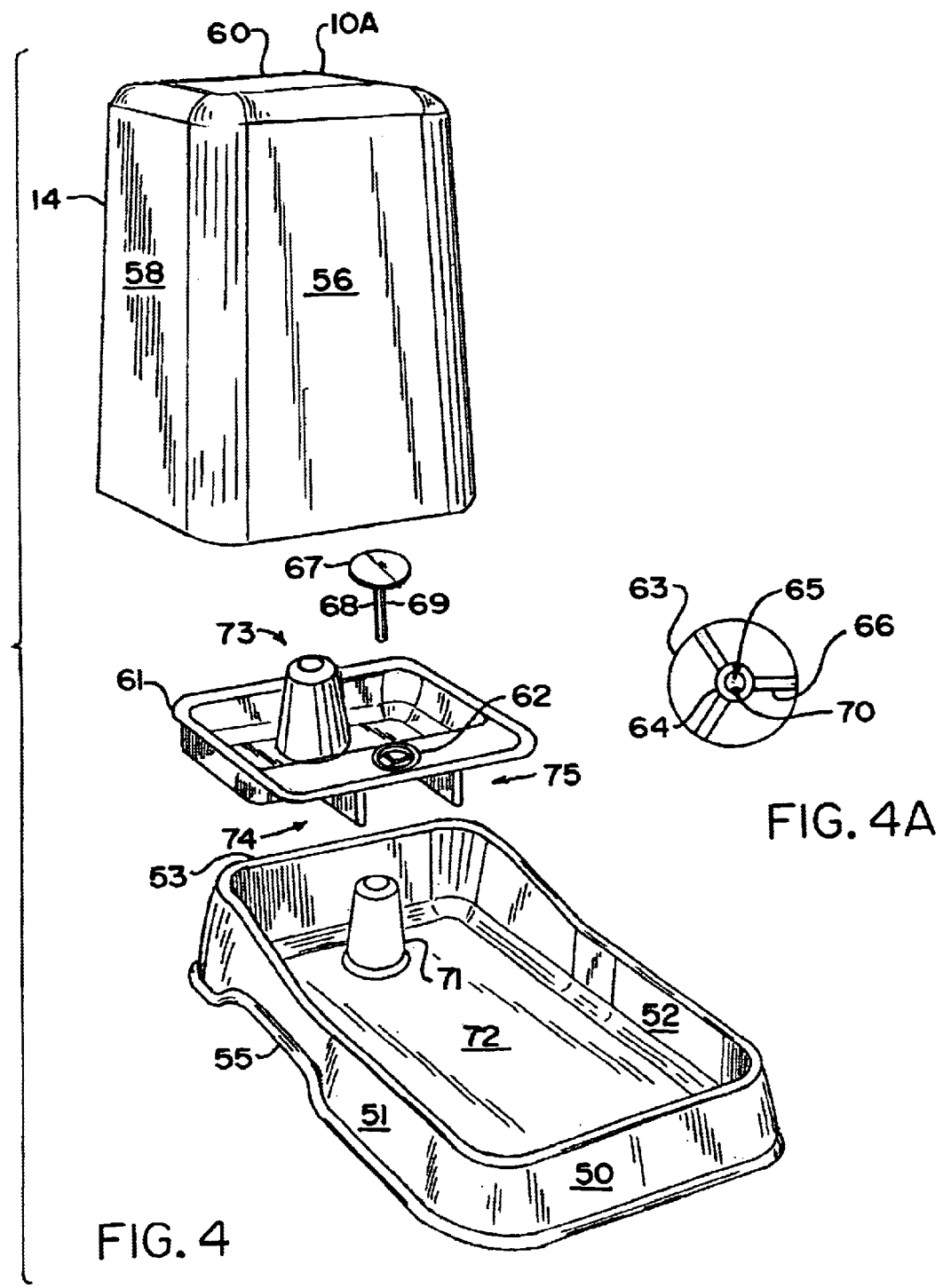
FIG. 4 is an exploded view of the waterer of FIG. 3.
FIG. 4A is a view of the orifice in the receptacle for receiving the valve stem.

The present invention is directed to an animal refreshment apparatus 10. This apparatus may be a combination waterer and feeder that are adapted to nest together in a compact arrangement for shipping, and display. In another embodiment, there can be a first and second pet feeders that can similarly nest together or a pair of first and second pet waterers as well. There is a waterer 10A and a feeder 10B. It will be appreciated by those skilled in the are that there can be a pair of waterers 10A or a pair of feeders 10B together. In each instance, there are a pair of trays 11 and 12 and a pair of receptacles 13 and 14. Each of the receptacles may be provided with a removable cover 15 and 16 or the cover 17 may be integral with the receptacle 14 as shown in FIG. 2. A removable cover is preferable because it is easier to fill the receptacle 14 with the cover removed as opposed to filling the receptacle through the opening 44. While the tray 11 may be any configuration, it has been found that the overall combination has a smaller "footprint" on a shelf or in a package if the tray 11 is generally rectangular in shape as shown in FIG. 2. The feeder tray 11 has a front wall 18 and a pair of sidewalls 19 and 20. Opposite the front wall 18 is rear wall 21. The walls may meet and generally form a 90° angle. In one embodiment, the juncture of the walls may be a curved portion 22. Other arrangements are possible also. Rear wall 21 may be generally higher than front wall 18 to accommodate sloping base surface 23. Sloping base surface 23 preferably forms an angle of greater than 148 degrees to the feeding surface 24. More preferably, the angle created by the base surface 23 and feeding surface 24 is greater than 155 degrees and most preferably greater than 165 degrees. By providing the base surface 23 with the angle to the feeding surface 24, the food in the receptacle is better able to flow out of the receptacle onto the feeding surface as the level of food in the tray decreases. Sidewalls 19 and 20 preferably rise in height as they extend from the front wall to the rear wall. The tray may also be provided with a pair of cutouts or handles 19A in the sidewalls 19 and 20 of the tray. These handles provide a convenient location for placing the user's fingers for transporting the tray or the assembled feeder.

Figure 5:
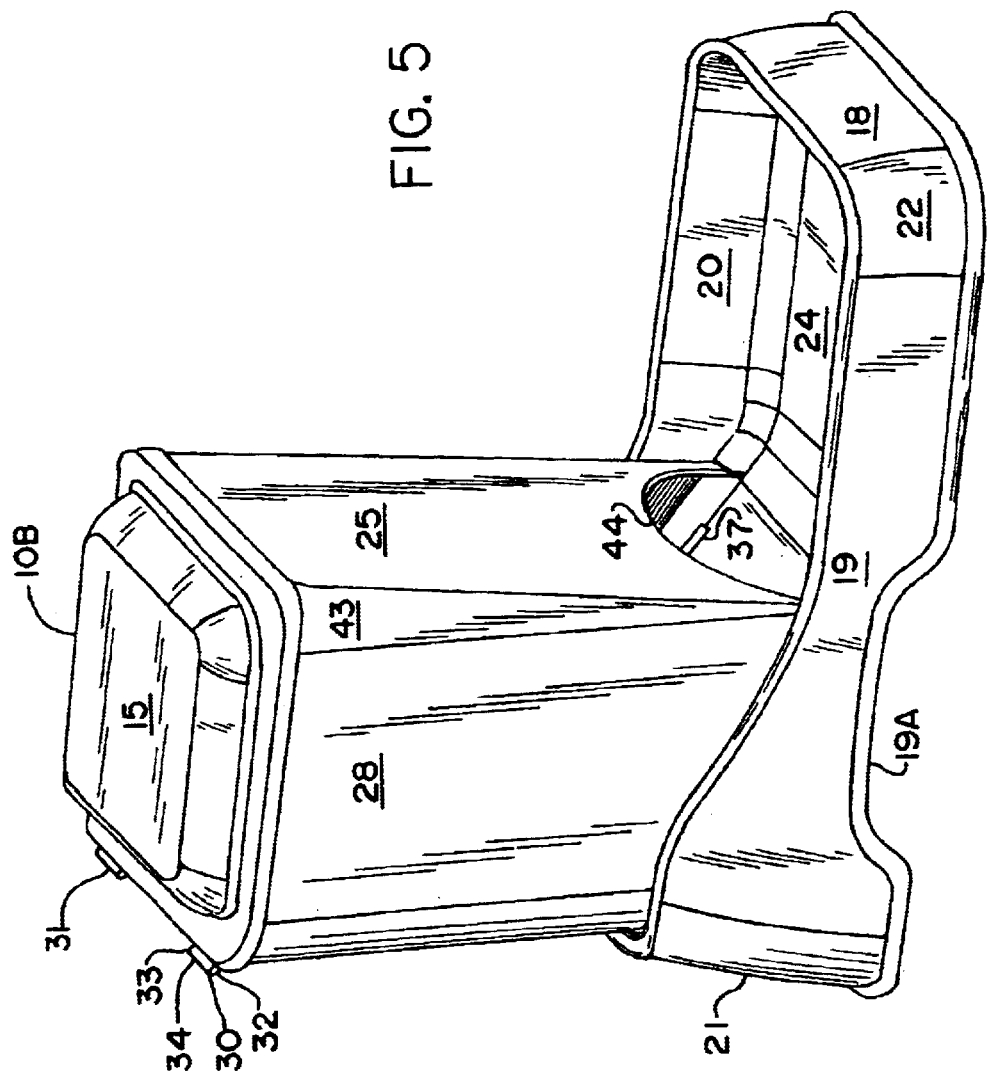
FIG. 5 shows the feeder of FIG. 2.

Receptacle 13 has a front wall 25 a rear wall 26 and a pair of sidewalls 27 and 28 that connect the front and rear walls. As can be seen more clearly in FIG. 6 the receptacle 13 preferably has an send end 29 that has a removable cover 15 over it. The cover 15 provides a convenient means for cleaning the container and/or filling the feeder with pet food, usually a relatively dry pet food. The cover may be hinged to facilitate addition of feed to the receptacle. As seen in FIG. 5 there is at least one hinge 30 and 31 that connects the cover to the receptacle. The hinge may be any suitable binge that is known by those skilled in the art. In one embodiment, there are a pair of members 32 and 33 that extend from the rear wall 26 of the receptacle 13. Each of the members 32 and 33 may have a pin, not shown, that extends inwardly toward the other member. These pins are received into an orifice in receiving member 34 that extends from the cover. Alternatively, the members 32 and 33 maybe provided with an orifice or dimple to receive a pin that extends from each end of the receiving member 34. The receptacle has a bottom 35, which is provided with generally the same slope as the base surface 23. The receptacle may be retained in the tray 11 by any suitable means such as, for example, friction. Alternatively, underside of the receptacle may be provided with a first rail 36 and a second rail 37. The rails have a vertical member 40 that extends downwardly from the underside of the receptacle. Over at least a portion of the length of the vertical member there is a generally horizontally extending flange 39. The upper surface of the base surface 23 is similarly provided with a pair of rails, a left rail, not shown, and a right rail 38. These rails preferably have an upwardly extending vertical member 41 and a over at least a portion of the length of the upwardly extending member 41 there is a generally horizontally extending flange 42 The receptacle may be held in place on the tray 11 by sliding the receptacle so that the flanges on underside of the receptacle mate with the flanges on the tray.

The receptacle is preferably provided with a generally square or rectangular cross-section. As in the case of the tray, the walls of the receptacle may meet and generally form a 90 degree angle. In one embodiment, the juncture of the walls may be a curved portion 43. Front wall 25 is provided with an opening 44 for feed to pass from the receptacle to the tray. The opening is preferably in the shape of a semicircle as this arrangement tends to prevent spilling of the feed as it drops into the tray from the receptacle.

The waterer has tray 12 has a front wall 50 and a pair of sidewalls 51 and 52. Opposite the front wall 50 is rear wall 53. The walls of the watering tray may meet and generally form a 90 degree angle. In one embodiment, the juncture of the walls may be a curved portion 54. Rear wall 53 may be higher than front wall 50. Sidewalls 51 and 52 preferably rise in height as they extend from the front wall to the rear wall. The watering tray may also be provided with a pair of cutouts 55 in the sidewalls 51 and 52 of the tray. These cutouts provide a convenient location for placing the user's fingers for transporting the tray or the assembled waterer.

Receptacle 14 preferably has a front wall 56 a rear wall 57 and a pair of side walls 58 and 59 that connect the front and rear walls. The receptacle is preferably provided with a generally square or rectangular cross-section. As in the case of the tray, the walls of the receptacle may meet and generally form a 90 degree angle. In one embodiment, the juncture of the walls may be a curved portion 76. However, other shapes are possible. The receptacle 14 may have an open end that has a removable or hinged cover over it. The openable cover or the removable the cover provides a convenient means for thoroughly clean the container and/or fill the feeder with water. The cover may be hinged in the same manner as the cover for the feeder. In the preferred embodiment, the receptacle 14 for the waterer does not have a removable cover and the top 60 is integral with the remainder of the receptacle. The receptacle has a removable bottom member 61 which may be provided with a valve means 62 to prevent leakage of water from the waterer. The valve means may be any suitable valve means known to those skilled in the art. In a preferred embodiment, the receptacle may be provided with an orifice 63 for passing water to the tray. The orifice 63 is provided with a ring 64 having an open center section 65. The ring may be retained in the orifice by a plurality of supports 66. The valve disk 67 has a stem 68. The valve stem 68 is seated in the open center section 65 of the ring 64. The stem 68 preferably has a notch 69 extending along a portion of its length. A nub 70 extending from the inside surface of the ring enters the notch 69 in the stem 68 and retains the valve in the valve means.

The receptacle may be retained in the tray 11 by any suitable means such as, for example, friction. Alternatively, the tray may be provided with a shaft or post 71 that extends upwardly from the upper surface 72 of the tray. The post 71 mates with a receiving member 73 in the underside of the bottom member 61 of the receptacle. The post helps prevent the pet from knocking over the receptacle. Baffles 74 and 75 may extend downwardly from the underside of the bottom member 61 to support the receptacle and prevent it from tipping over when the receptacle is removed from the tray. In addition, the baffles prevent the stem from rising and permitting water to leak when the receptacle is removed from the tray and placed on a resting surface. Another aspect of the baffles occurs when the receptacle is filled from the valve orifice opening. In this instance the baffles help direct water into the orifice.

In order to fill the receptacle for the waterer, the receptacle 14 is lifted from the tray. As the receptacle is lifted the valve stem 68 drops downwardly in the ring 64 causing the valve disk 67 to block the orifice 63 and prevent excessive water from escaping from the receptacle. Typically, depending on the tolerances of the parts only a negligible amount of water should leak when the receptacle is lifted off of the tray. When the user is at the sink or other location for filling the receptacle, the bottom member 61 is removed and the receptacle is filled and the bottom member is replaced. When the filled receptacle is returned to the tray, the receptacle is inverted so that the bottom member 61 is positioned downwardly with the valve disk in place to prevent water from spilling. As the receptacle is lowered onto the tray the valve stem contacts the upper surface 72 of the tray. The contact of the stem with the upper surface causes the valve disk to rise thus opening the receptacle to permit water to flow from the receptacle into the tray for the pet to drink. In some instances a portion of the upper surface 72 of the tray may be provided with a raised portion that permits the stem to be shorter. The advantage of a shorter stem is that there is less risk that imperfections in the resting surface could cause the stem to push the disk upwardly and open the orifice thus causing fluid to leak from the receptacle, when the receptacle is removed from the tray.

Figure 1:
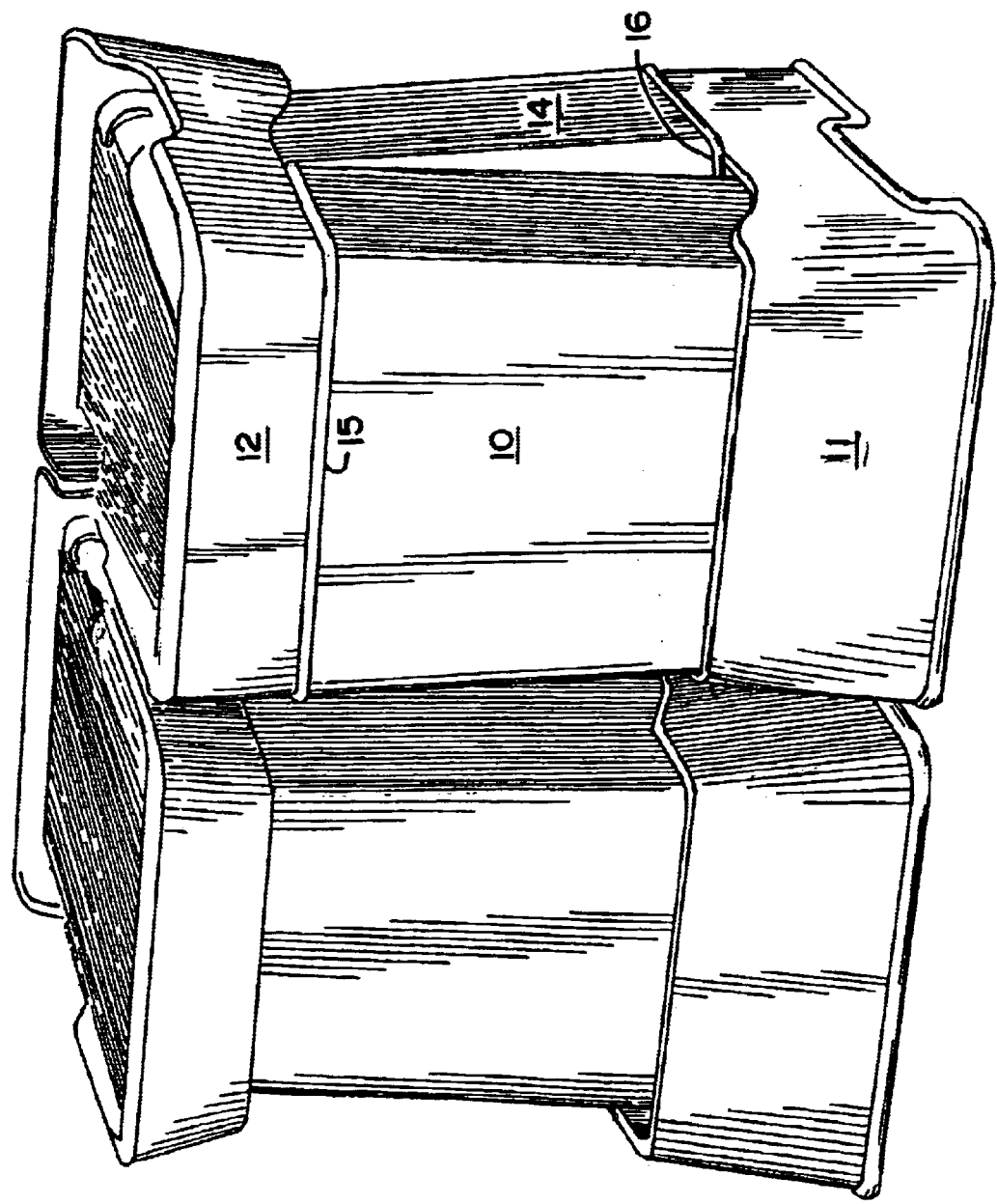
FIG. 1 is a perspective view of a pair of pet waterers and feeders assembled together in accordance with the present invention.

One of the advantages of the present invention is demonstrated in FIG. 1 where the top 60 of the waterer may be inserted in the area of the feeding surface when it is inverted for packing or shipment. Similarly, the cover of the feeder may be inserted into the open portion of the waterer tray to form a compact arrangement as depicted in FIG. 1. The shipping arrangement of the present invention helps reduce the cubic volume of the separate parts by about 5 to 10% or more.

I claim:

1. A pair of pet waterers adapted to be packaged together in a manner that reduces the amount of volume occupied by the waterers compared to if they were packaged separately comprising:

a first pet waterer having a first water receptacle for storing water, said first receptacle having a first end and a second end and a first tray to permit a pet to drink the water, said first end of said first water receptacle when placed in said first tray occupying only a portion of the tray, and a second pet waterer having a second water receptacle for storing water, said second receptacle having a first end and a second end and a second tray to permit a pet to drink the water, said first end of said second water receptacle when placed in said second tray occupying only a portion of said tray and wherein at least one of said pet waterers has a removable cover said cover having a raised center portion, one or more sidewalls extending from said center portion and a flange extending away from said center portion from said side walls and wherein the second end of the first water receptacle is adapted to be received by the second tray and the second end of the second water receptacle is adapted to be received by the first tray such that said raised center portion extends into said tray and said flange rests on a sidewall of said tray.

2. The pet waterers according to claim 1 wherein each tray has a front wall, a rear wall and a pair of opposing side walls.

3. The pet waterers according to claim 2 wherein each tray is generally rectangular in shape.

4. The pet waterers according to claim 3 wherein the walls form a 90 degree angle.

5. The pet waterers according to claim 3 wherein a juncture of the walls comprises a curved portion.

6. A pair of pet feeders adapted to be packaged together in a manner that reduces the amount of volume occupied by the feeders compared to if they were packaged separately comprising a first pet feeder having a first feed receptacle for storing feed, said receptacle having a first end and a second end and a first tray to permit a pet to eat the feed, said first end of said feed receptacle when placed in said first tray occupying only a portion of the tray, and a second pet feeder having a second feed receptacle for storing feed, said receptacle having a first end and a second end and a second tray to permit a pet to eat the feed, said first end of said receptacle when placed in said second tray occupying only a portion of said tray and wherein at least one of said pet feeders has a removable cover, said cover having a raised center portion, and one or more sidewalls extending from said center portion and a flange extending from said sidewalls and away from said center portion and wherein the second end of the first feed receptacle is adapted to be received by the second tray and the second end of the second feed receptacle is adapted to be received by the first tray, such that said raised center portion extends into said tray and said flange rests on a sidewall of said tray.

7. The pet feeders according to claim 6 wherein at least one tray has a sloping base surface that forms an angle of greater than 165 degrees to a feeding surface of the tray.

8. The pet feeders according to claim 6 wherein at least one tray has a sloping base surface that forms an angle of greater than 148 degrees to a feeding surface.

9. The pet feeders according to claim 6 wherein at least one tray is provided with a pair of cutouts in the side walls of said tray for carrying the tray.

10. The pet waterers according to claim 1 wherein at least one tray is provided with a pair of cutouts in the side walls of the tray for carrying the tray.

11. The pet feeders according to claim 6 wherein the feed receptacles have a front wall, a rear wall, and a pair of side walls that connect the front and rear walls.

12. The feeders according to claim 6 wherein the second end of one of the receptacles is open and adapted to receive a cover.

13. The pet feeders according to claim 12 wherein the cover is hinged.

14. The pet waterers according to claim 1 wherein the second end of one of the receptacles is open and adapted to receive a cover.

15. The pet waterers according to claim 14 wherein the cover is hinged.

16. A pair of pet waterers adapted to be packaged together in a manner that reduces the amount of volume occupied by the waterers compared to if they were packaged separately comprising:

a first pet waterer having a first water receptacle for storing water, said first receptacle having a first end and a second end and a first tray to permit a pet to drink the water, said first end of said first water receptacle when placed in said first tray occupying only a portion of the tray, and a second pet waterer having a second water receptacle for storing water, said second receptacle having a first end and a second end and a second tray to permit a pet to drink the water, said first end of said second water receptacle when placed in said second tray occupying only a portion of said tray and wherein the second end of the first water receptacle is adapted to be received by the second tray and the second end of the second water receptacle is adapted to be received by the first tray and wherein the first end of at least one of the receptacles is provided with a first rail and a second rail, each of said rails having a vertical member that extends downwardly from the first end of the receptacle and wherein over at least a portion of a length of said vertical member there is a generally horizontally extending flange, and wherein the tray is provided with a pair rails, said rails having an upwardly extending vertical member and wherein over at least a portion of a length of said upwardly extending member there is a generally horizontally extending flange, said receptacle being capable of being held in place on said tray by sliding the receptacle so that the flanges on underside of the receptacle mate with the flanges on the tray.

17. A pair of pet feeders adapted to be packaged together in a manner that reduces the amount of volume occupied by the feeders compared to if they were packaged separately comprising:

a first pet feeder having a first feed receptacle for storing feed, said first receptacle having a first end and a second end and a first tray to permit a pet to eat the feed, said first end of said first feed receptacle when placed in said first tray occupying only a portion of the tray, and a second pet feeder having a second feed receptacle for storing feed, said second receptacle having a first end and a second end and a second tray to permit a pet to eat the feed, said first end of said second feeder receptacle when placed in said second tray occupying only a portion of said tray and wherein the second end of the first feeder receptacle is adapted to be received by the second tray and the second end of the second feeder receptacle is adapted to be received by the first tray and wherein the first end of at least one of the receptacles is provided with a first rail and a second rail, each of said rails having a vertical member that extends downwardly from the first end of the receptacle and wherein over at least a portion of a length of said vertical member there is a generally horizontally extending flange, and wherein the tray is provided with a pair rails, said rails having an upwardly extending vertical member and wherein over at least a portion of a length of said upwardly extending member there is a generally horizontally extending flange, said receptacle being capable of being held in place on said tray by sliding the receptacle so that the flanges on the underside of the receptacle mate with the flanges on the tray.

18. The pet feeders according to claim 6 wherein at least one receptacle has a front wall that has a width, said front wall being provided with an opening for feed to pass from the receptacle to the tray.

19. The pet feeders according to claim 18 wherein the opening is in the shape of a semicircle.

20. The pet feeders according to claim 19 wherein a diameter of said semicircular opening in the receptacle is only slightly less than the width of the front wall of the receptacle.

21. A pair of pet waterers adapted to be packaged together in a manner that reduces the amount of volume occupied by the waterers compared to if they were packaged separately comprising:

a first pet waterer having a first water receptacle for storing water, said first receptacle having a first end and a second end and a first tray to permit a pet to drink the water, said first end of said first water receptacle when placed in said first tray occupying only a portion of the tray, and a second pet waterer having a second water receptacle for storing water, said second receptacle having a first end and a second end and a second tray to permit a pet to drink the water, said first end of said second water receptacle when placed in said second tray occupying only a portion of said tray and wherein the second end of the first water receptacle is adapted to be received by the second tray and the second end of the second water receptacle is adapted to be received by the first tray and wherein at least one of the water receptacles has a removable bottom member.

22. A pair of pet waterers adapted to be packaged together in a manner that reduces the amount of volume occupied by the waterers compared to if they were packaged separately comprising:

a first pet waterer having a first water receptacle for storing water, said first receptacle having a first end and a second end and a first tray to permit a pet to drink the water, said first end of said first water receptacle when placed in said first tray occupying only a portion of the tray, and a second pet waterer having a second water receptacle for storing water, said second receptacle having a first end and a second end and a second tray to permit a pet to drink the water, said first end of said second water receptacle when placed in said second tray occupying only a portion of said tray and wherein the second end of the first water receptacle is adapted to be received by the second tray and the second end of the second water receptacle is adapted to be received by the first tray and wherein at least one of the water receptacles has a bottom member which is provided with a valve means to prevent leakage of water from the waterer.

23. A pair of pet waterers adapted to be packaged together in a manner that reduces the amount of volume occupied by the waterers compared to if they were packaged separately comprising:

a first pet waterer having a first water receptacle for storing water, said first receptacle having a first end and a second end and a first tray to permit a pet to drink the water, said first end of said first water receptacle when placed in said first tray occupying only a portion of the tray, and a second pet waterer having a second water receptacle for storing water, said second receptacle having a first end and a second end and a second tray to permit a pet to drink the water, said first end of said second water receptacle when placed in said second tray occupying only a portion of said tray and wherein the second end of the first water receptacle is adapted to be received by the second tray and the second end of the second water receptacle is adapted to be received by the first tray and wherein at least one of the water receptacles has a bottom member which is provided with a valve means to prevent leakage of water from the waterer and wherein the bottom member has an orifice for passing water to the tray, said orifice having a ring having an open center section and being retained in said orifice by a plurality of supports extending from the ring to the bottom member, said ring being adapted to receive a stem extending from a valve disk for sealing the orifice.

24. A pair of pet waterers adapted to be packaged together in a manner that reduces the amount of volume occupied by the waterers compared to if they were packaged separately comprising:

a first pet waterer having a first water receptacle for storing water, said first receptacle having a first end and a second end and a first tray to permit a pet to drink the water, said first end of said first water receptacle when placed in said first tray occupying only a portion of the tray, and a second pet waterer having a second water receptacle for storing water, said second receptacle having a first end and a second end and a second tray to permit a pet to drink the water, said first end of said second water receptacle when placed in said second tray occupying only a portion of said tray and wherein the second end of the first water receptacle is adapted to be received by the second tray and the second end of the second water receptacle is adapted to be received by the first tray and wherein at least one of the water receptacles has a bottom member which is provided with a valve means to prevent leakage of water from the waterer and wherein the bottom member has an orifice for passing water to the tray, said orifice having a ring having an open center section and being retained in said orifice by a plurality of supports extending from the ring to the bottom member, said ring being adapted to receive a stem extending from a valve disk for sealing the orifice and wherein the stem has a notch extending along a portion of a length of said stem and said ring has a nub which enters said notch in said stem and retains said valve disk in said ring.

25. A pair of pet waterers adapted to be packaged together in a manner that reduces the amount of volume occupied by the waterers compared to if they were packaged separately comprising:

a first pet waterer having a first water receptacle for storing water, said first receptacle having a first end and a second end and a first tray to permit a pet to drink the water, said first end of said first water receptacle when placed in said first tray occupying only a portion of the tray, and a second pet waterer having a second water receptacle for storing water, said second receptacle having a first end and a second end and a second tray to permit a pet to drink the water, said first end of said second water receptacle when placed in said second tray occupying only a portion of said tray and wherein the second end of the first water receptacle is adapted to be received by the second tray and the second end of the second water receptacle is adapted to be received by the first tray and wherein at least one of said trays has a post extending upwardly in the tray said post mating with a receiving member in a bottom member of the receptacle.

26. A pair of pet waterers adapted to be packaged together in a manner that reduces the amount of volume occupied by the waterers compared to if they were packaged separately comprising:

a first pet waterer having a first water receptacle for storing water, said first receptacle having a first end and a second end and a first tray to permit a pet to drink the water, said first end of said first water receptacle when placed in said first tray occupying only a portion of the tray, and a second pet waterer having a second water receptacle for storing water, said second receptacle having a first end and a second end and a second tray to permit a pet to drink the water, said first end of said second water receptacle when placed in said second tray occupying only a portion of said tray and wherein the second end of the first water receptacle is adapted to be received by the second tray and the second end of the second water receptacle is adapted to be received by the first tray and wherein at least one of the water receptacles has one or more baffles extending downwardly from a bottom member to permit the receptacle to stand upright when removed from the tray.

27. A pet waterer comprising a water receptacle for storing water, said water receptacle having a first end and a second end, a tray to permit a pet to drink the water, said first end of said water receptacle when placed in said tray occupying only a portion of said tray, said tray having a post extending upwardly from said tray, said post mating with a receiving member in said first end of the receptacle.

28. The pet waterer according to claim 27 wherein the water receptacle has one or more baffles extending downwardly from the first end of said receptacle.

29. The pet waterer according to claim 27 wherein said receptacle has a valve means to prevent leakage of water from the waterer in said first end of said receptacle.

30. The pet waterer according to claim 29 wherein said first end of said receptacle has an orifice for passing water to the tray, said orifice having a ring having an open center section said ring being retained in said orifice by a plurality of supports extending from the ring to said receptacle, said ring being adapted to receive a stem extending from a valve disk for sealing the orifice.

31. The pet waterer according to claim 30 wherein the valve stem has a notch extending along a portion of a length of said stem and said ring has a nub which enters said notch in said stem and retains said valve disk in said ring.

32. A first pet feeder and a first pet waterer adapted to be packaged together in a manner that reduces the amount of volume occupied by the first pet feeder and a first pet waterer compared to if they were packaged separately comprising a first pet feeder having a first feed receptacle for storing feed, said receptacle having a first end and a second end and a first tray to permit a pet to eat the food, said first end of said feed receptacle when placed in said first tray occupying only a portion of the tray, and a first pet waterer having a second feed receptacle for storing water, said receptacle having a first end and a second end and a second tray to permit a pet to drink the water, said first end of said water receptacle when placed in said second tray occupying only a portion of said tray, and wherein at least a first pet feeder has a removable cover, said cover having a raised center portion, one or more sidewalls extending from said center portion and a flange extending away from said center portion and away from said sidewalls, and wherein the second end of the first water receptacle is adapted to be received by the first tray, and the second and of the first feed receptacle is adapted to be received by the second tray, such that said raised portion of said cover of said first pet feeder extends into said second tray and said flange of said cover rests on a sidewall of said second tray.

* * * * *

Disclaimer

6,863,025 — William Van Ness, Saddle River, NJ (US). PET WATERER AND FEEDER. Patent dated March 8, 2005. Disclaimer filed May 18, 2006, by the assignee, Van Ness Plastic Molding Company, Inc.

The term of this patent shall not extend beyond the expiration date of Pat. No. 6,863,025.

*(Official Gazette, May 27, 2008)*